March 10, 1970 M. F. ESSES 3,499,377

ARTWORK PRODUCTION SYSTEM

Filed Jan. 3, 1967

Max F. Esses
INVENTOR.

BY Carl B. Fox, Jr.
ATTORNEY

United States Patent Office 3,499,377

Patented Mar. 10, 1970

3,499,377

ARTWORK PRODUCTION SYSTEM

Max F. Esses, 3262 Branard, Apt. 10, Houston, Tex. 77006

Filed Jan. 3, 1967, Ser. No. 606,930
Int. Cl. G03b *15/00, 27/02*
U.S. Cl. 95—85 2 Claims

ABSTRACT OF THE DISCLOSURE

A system of preparing production artwork to be photographed. The artwork assembly is made up of an illustration board, a reproduction type proof sheet, a transparent sheet and an additional sheet superimposed on the other sheets. Each sheet has corresponding grids which are photographically non-reproductively printed on it. These grids are used in the alignment and positioning of artwork on the component sheets.

BACKGROUND OF THE INVENTION

In the graphic arts industry, which encompasses the printing, lithographing, duplicating, publishing, advertising, commercial arts, and photoengraving fields, finished "camera ready" or production artwork is needed before going to the photographic stage of the mechanics of producing a finished printed piece (e.g., plates for advertisements, printed booklets, literature or a multitude of other printed products). The finished "camera ready" or production artwork is prepared by artists who assemble, with precision, the artwork components, which consist of reproduction type proofs, illustrations, headlines, "red windows," photoprints, photos, "pickups," mechanical screens, etc., mounted onto an artboard (thick cardboard) base with necessary "overlay" sheets for separating colors, and the like.

The mounting of these components is tedious work, due to the precision requirements of alignment and positioning of many separate pieces, many of which are quite small. Not only must the various elements be properly composed, but they must be accurately aligned in many instances in order that the finished work not appear distasteful or unappealing to the eye of the viewer. Artistic effects are often desired, and both positioning and alignment are necessary in this regard.

Production art almost invariably includes a base piece, which is referred to as the illustration board (artboard), and which is usually a sheet of relatively stiff cardboard or paper. Reproduction type proofs are mounted onto the illustration board, and usually an overlay sheet is required onto which additional reproduction type proofs are mounted. In many cases, additional sheets, of smaller size, are mounted onto the base artboard and the overlay sheet, these commonly being photographic paper or other types of paper printing or artwork. Upon the reproduction proof paper there are printed various elements of typing or printing, by typographers, cold typers, varitypers, and the like. Artwork such as drawings, photographs, or the like, are also placed upon the base. Each of these elements must be positioned and aligned in order that the overall resulting composition will be correct and pleasing. The overlay sheet may carry similar matter, frequently designed to overlay the materials upon the base artboards. The overlay sheets are at least somewhat transparent so that the materials upon the underlying base artboard will show through the overlay sheets for artist viewing purposes to determine position and spacing with relation to each other, but not through the elements on the overlay sheet which cover them.

Therefore, the positioning and alignment of the several elements making up a piece of production artwork consumes a relatively considerable period of time, and this is true especially where complicated positioning and alignment measurements and markings must be made in order to achieve the desired effect.

It is this problem of positioning and alignment that this invention solves to a considerable degree.

The illustration boards, reproduction proof papers, overlay sheets, photographic papers and other components in use today consist of plain sheets having no means supplied for use in proper positioning and alignment of the materials.

SUMMARY OF THE INVENTION

The system provided by this invention will allow the artist to mount the components of production artwork more quickly, at the same time maintaining accuracy, because of the provision of pre-printed fadeout grid patterns on each of the components coming together at the artist's table—illustration board (artboard) base, reproduction proof paper, photo print papers, overlay sheets, and others. Never before has a system of matching grid patterns on each of the component bases (illustration board, reproduction proof paper, photoprint contact paper, overlay acetate sheets) been used in this manner for this particular industry to facilitate the production of camera ready artwork.

The invention provides a system which facilitates alignments of and positionings of materials placed or mounted upon the illustration board (artboard) and overlay sheets of camera ready or production artwork. In addition, the invention provides means for positioning and alignment of the reproduction type proofs upon the illustration board, and upon overlay sheets. Thus, the invention provides a system whereby these elements, and the elements to be mounted thereon, can all be properly positioned and aligned very rapidly and with a high degree of accuracy. According to the invention, the several elements, including the illustration board, reproduction proof paper, overlay sheet or sheets, and the photographic and other insert materials to be placed thereon are provided with grids which are photographically invisible (fadeout grids) whereby when the production artwork is finally copied the grid lines do not appear on the reproductions. The various elements may have grids of the same or different forms, it being preferred in most cases that the grids of each be identical. The printed lines making up the grids on each of these elements are colored such that they are not photographically copied. Pale blue or other "fadeout" colors may be used for the grids.

The grids on each of the elements makes it possible to position and align the elements, each with respect to the other elements, and to determine spacings with regard to the paper and board sheets, and with regard one to another.

DESCRIPTION OF THE PREFERRED EMBODIMENTS

Figure 1:
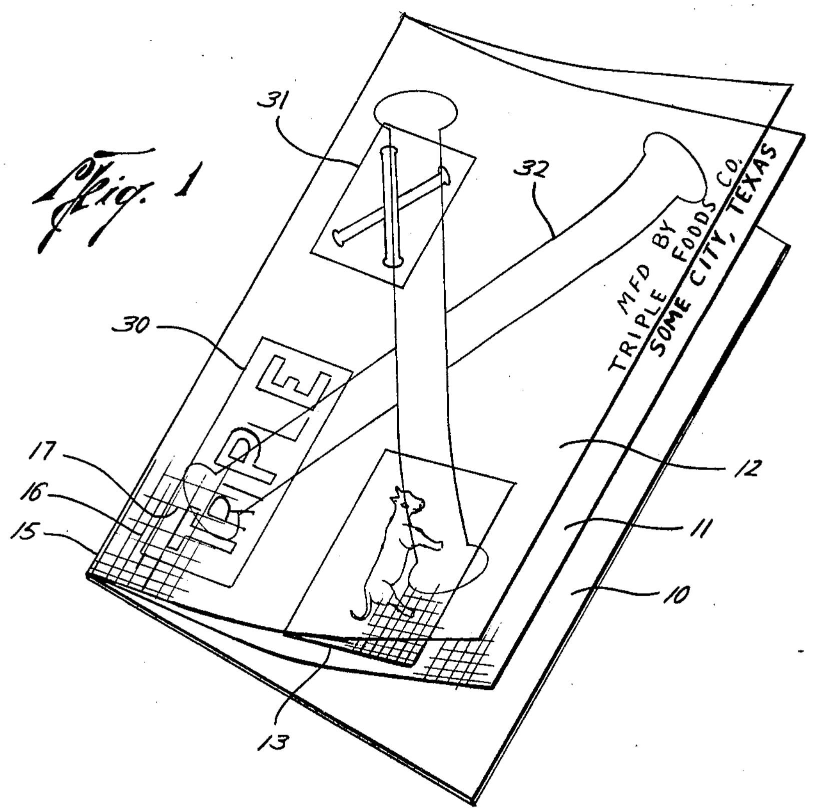
FIG. 1 is an upper perspective view of an assembly of production artwork, the elements thereof being shown moved apart in order to clarify the assembly according to the system.

Referring first to FIG. 1 of the drawings, there is shown a lower sheet or board, termed the illustration board or artboard, which may be of single or plural ply board, usually heavy cardboard or paper. The illustration board is referred to by reference numeral 10. A sheet of reproduction type proofs 11 is mounted onto illustration board 10, usually by hot wax or rubber cement, sheet 11 being shown in FIG. 1 in an upwardly moved unmounted position. An overlay sheet 12 of at least somewhat transparent material overlies the artboard 10 and sheet 11 which will be fixedly mounted on the artboard. An insert sheet 13 of photographic paper, or other material, is inserted between sheet 11 and sheet 12, and will be mounted in correct position and alignment on the reproduction type proofs sheet 11.

Figure 2:
FIG. 2 is a side elevational view of one side of the assembly shown in FIG. 1.

Referring now to FIG. 2 of the drawings, the several sheets described in connection with FIG. 1 are shown in flat superimposed conditions. The sheet 10 with sheet 11 mounted thereon by hot wax or rubber cement and sheet 12 are fixed along one of their edges, this edge being indicated by reference numeral 15. The sheets may be thus connected or assembled in any suitable manner, for example by use of adhesive backed tape, by staples, clamps, brads, or any other suitable manner. The sheets may be assembled for use, or may be supplied as integral assemblies. The sheets may be of the same size, as shown in the drawings, or at times may be of different sizes and shapes as found to be convenient for a particular piece of production artwork.

Each of the illustration board 10, the reproduction proof paper 11, and the overlay sheet 12, as well as the photographic paper insert sheet 13, are shown in FIG. 1 to bear cross-hatched printed grids. The grids of the several sheets may be the same or different, depending upon the requirements of making the production artwork. The plural lines 16 running in one direction, and the plural lines 17 at right angles to the lines 16, are printed in a color which, under the conditions of photographing or in other manner reproducing the assembled reproduction proof, are invisible (fade out) in that they are not copied with the materials assembled thereon. Commonly, light blue lines are not reproduced or visible by normal photographic methods of reproduction. Other colors may be used, the light source and photographic emulsions being modified such that the desired lack of reproduction is achieved.

Figure 3:
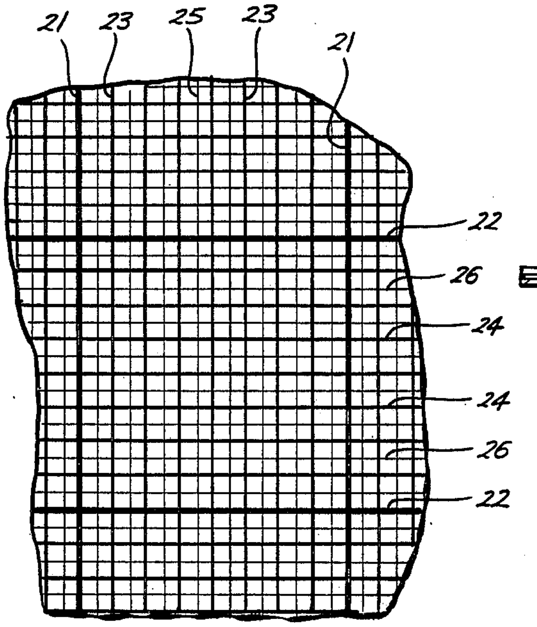
FIG. 3 is an enlarged partial plan view showing the preferred form of grid to be employed in connection with the invention.

Referring now to FIG. 3 of the drawings, there is indicated a type of grid which will be especially useful in the making up of production artwork. The dimensions of the grid shown in FIG. 3 are enlarged in order to clarify the showing. In the grid of FIG. 3 there are shown lines 21 which are spaced apart uniformly over the surfaces of a sheet, for example, the lines 21 may be spaced one-half inch apart. The lines 22, running perpendicularly to lines 21, are similarly spaced apart. Between the lines 21, 21, and the lines 22, 22, there are shown the lines 23, 24 which are of somewhat lighter weight, or narrower weight, than the lines 21, 22. If the line 21 and line 22 spacings are ½ inch, the lines 23, 24 will be spaced uniformly $\frac{1}{16}$ inch apart. Between the lines 23, 24, there are shown lines 25, 26 each halfway between the lines 23 or 24. The lines 25, 26 are even lighter than the lines 23, 24. Briefly, the grid shown in FIG. 3, if the lines 21 are ½ inch apart and the lines 22 also ½ inch apart, may be described as a grid having accent ½ inch lines, screen back $\frac{1}{32}$ inch lines, on a $\frac{1}{16}$ inch grid.

Referring again especially to FIG. 1 of the drawings, the sheet of photographic paper 13 previously mentioned bears a photographic picture of a dog thereon. The grid on photographic paper sheet 13 is utilized to align and position the sheet by matching of the grid of the sheet 13 with the grid on production type proofs sheet 11. The insert sheet 30 bearing the word "TRIPLE," as shown, and the insert sheet 31, bearing the "X" in a color different from the letters of the word "TRIPLE," are positioned and aligned by counting grid spaces of the grid on production type proofs sheet 11, so that the spaces to the sides of each of these inserts and to the tops and bottoms thereof are made as desired. The grid on sheet 11 serves also to permit the word "TRIPLE" and the "X" to be made straight across the page readily. The large image X, referred to by reference numeral 32, is on overlay sheet 12 and is semitransparent so that the word "TRIPLE" and the "X" on inserts 30, 31 will be partially visible therethrough, the dog image on sheet 13 likewise being partially visible through the overlaid "X." The words "MFD BY TRIPLE FOODS CO. SOME CITY, TEXAS" are printed on reproduction type proof sheets 11, and this printing will be partly covered by the large transparent "X" on overlay sheet 12.

Thus, it will be observed, inserts such as sheet 13 which bear grid markings thereon may be readily aligned and positioned by matching of the grids on the superimposed sheets, and inserts such as 30, 31 which do not have (but may have) grids thereon may be quickly and accurately spaced and aligned through utilization of the system according to the invention. All of the inserts 13, 30, and 31 may be placed accurately with respect to the overlay image 32 without the necessity for making any marks or measurements on any of the sheets, but merely by utilization of the several grids on the sheets. After the inserts have been properly positioned beneath the overlay, the production artwork is complete, the sheets placed flushly together as shown in FIG. 2 being usually photographically reproduced to create the film negatives of plates for later use. As stated before, the grid lines do not reproduce during reproduction from the production artwork, so that the final printing or reproduction is as indicated in FIG. 1 except that the grids do not appear.

The system may at times be utilized without various of the components, for example, the overlay may not be used, or the overlay may not bear an image, or various other modifications may be made.

While preferred embodiments of the invention have been shown and described, modifications thereof may be made by a person skilled in the art without departing from the spirit of the invention, and it is intended to protect by Letters Patent all forms of the invention falling within the scope of the following claims.

I claim:

1. Camera ready production artwork assembly, comprising a sheet of illustration board forming a base for mounting artwork components and a paper reproduction type proofs sheet superimposed over said sheet of illustration board, said illustration board and said reproduction type proofs sheet having mutually correlated printed grid means thereon adapted for non-reproduction by photographic reproduction means, said reproduction type proofs sheet being fixed over said sheet of illustration board in a position wherein said grids of said reproduction type proofs sheets and illustration board are mutually aligned, said grid means providing position guide means for mounting artwork components on said sheets, at least one at least partially transparent overlay sheet having a said printed grid means thereon fixedly superimposed over said reproduction type proofs sheet with its grid means aligned with the grid means of said illustration board and reproduction type proofs sheet, artwork component means including at least one additional sheet assembled upon the surface of at least one of said paper sheet and said overlay sheet, at least one said additional sheet having said grid means printed thereon, the positions of all said additional sheets being determined by said grid means.

2. The combination of claim 1, at least one said additional sheet comprising image-bearing photographic paper having said grid means printed thereon.

References Cited

UNITED STATES PATENTS

| | | | |
|---|---|---|---|
| 3,353,281 | 11/1967 | Schulze | 355—79 |
| 1,333,544 | 3/1920 | Grass | 95—85 |
| 1,777,144 | 9/1930 | Innes | 95—85 XR |

FOREIGN PATENTS

| | | |
|---|---|---|
| 714,630 | 9/1954 | Great Britain. |

NORTON ANSHER, Primary Examiner

LEO H. McCORMICK, Jr., Assistant Examiner

U.S. Cl. X.R.

355—79